(12) United States Patent
Hobbs (10) Patent No.: US 6,502,464 B1
(45) Date of Patent: Jan. 7, 2003

(54) ENERGY REDISTRIBUTION SYSTEM FOR A VIBRATING SYSTEM

(76) Inventor: Gregg K. Hobbs, 4300 W. 100th Ave., Westminster, CO (US) 80030-2481

( * ) Notice: Subject to any disclaimer, the term of this patent is extended or adjusted under 35 U.S.C. 154(b) by 76 days.

(21) Appl. No.: 09/675,751

(22) Filed: Sep. 29, 2000

Related U.S. Application Data (63) Continuation-in-part of application No. 09/536,188, filed on Mar. 24, 2000, now Pat. No. 6,422,083.

(51) Int. Cl.⁷ .................................................. G01M 7/00
(52) U.S. Cl. .......................................... 73/663; 73/1.82
(58) Field of Search .......................... 73/662, 663, 665, 73/666, 667, 668

(56) References Cited

U.S. PATENT DOCUMENTS 5,979,242 A * 11/1999 Hobbs .......................... 73/663

* cited by examiner

Primary Examiner—Helen Kwok
(74) Attorney, Agent, or Firm—Patton Boggs LLP (57) ABSTRACT

The present energy redistribution system for a vibrating system is operable to redistribute energy from axes and frequencies of high acceleration to axes and frequencies of low acceleration. The present energy redistribution system for a vibrating system enables one to balance the vibration spectra and over all levels between axes. In addition, the energy redistribution system for a vibrating system can be used to enhance the low frequency content of the spectra by redistributing energy from the existing vibrations in the high frequency region of the spectrum. The energy redistribution is accomplished by placing a shaped object into an enclosure, termed an equalizing module, which is attached to the vibrating system. The location of the equalizing module affects the frequency and direction from which energy is removed as the shaped object responds to the vibration present at the location of mounting of the equalizing module.

10 Claims, 5 Drawing Sheets

ENERGY REDISTRIBUTION SYSTEM FOR A VIBRATING SYSTEM

CROSS REFERENCE TO RELATED APPLICATIONS

This application is a continuation-in-part of U.S. patent application Ser. No. 09/536,188, filed Mar. 24, 2000, now U.S. Pat. No. 6,422,083, titled "Tuned Energy Redistribution System for Vibrating Systems" which is related to U.S. patent application Ser. No. 09/063,157, titled "Multi-Level Vibration Test System Having Controllable Vibration Attributes", now issued as U.S. Pat. No. 5,979,242.

FIELD OF THE INVENTION

This invention relates to vibrating systems and to an energy redistribution system for use in the vibrating system that functions to level the power spectral density of the vibrations and to redistribute vibrational energy among the three orthogonal linear and three rotational axes of vibration in a controllable manner.

PROBLEM

It is a problem in the field of vibrating systems to control the amplitude of vibrations as well as the spectral density of vibrations in each of the three orthogonal linear and three rotational axes of vibration. One such vibrating system consists of a mass of predefined shape and extent that responds to a series of impulses by vibrating as a function of the characteristics of the mass, as well as the frequency, pulse shape and magnitude of the impulses applied to the mass and the location of the site at which the impulses are imparted. These vibrating systems typically have very irregular spectrum in the above-noted six axes of vibration.

In the field of vibrating systems, there are impact driven vibration test systems that are used to test products to determine if design or process defects are present.

In these vibration test systems, it is desirable to excite all (or at least selected) frequencies of vibration as well as all six axes of vibration (three translation axes and three rotation axes) simultaneously and in a controllable manner. The present impact driven vibration test systems available for the vibration excitation of products lack reasonably flat spectra in the various axes and the balance among these axes (the overall level of vibration in each axis) is usually not very uniform. Exact uniformity is not required, but some commercially available impact driven vibration test systems have spectral density variations that leave some frequencies and axes of vibration essentially unexcited and some axes and frequencies of vibration excited to comparatively overly high levels. Additionally, the impact driven vibration test systems are usually very weak in the critical low frequency areas of vibration. The existing impact driven vibration test systems not only suffer from a lack of vibration in some frequencies and axes of vibration but also do not have any apparatus that allows the translation of energy from high frequencies to low frequencies of vibration.

The impact driven vibration test systems are typically implemented as a basic shaker table that includes a platform upon which the product is mounted. The platform is supported on flexible supports that permit the vibration of the table freely in all directions, independent of the environment. The shaker table generates vibration in six axes by providing either pneumatically driven or mechanically driven actuators, termed exciters or vibrators, that produce an impact to initiate the vibrations. The platform couples the vibrations from the actuators to the product. The typical actuator is an impact device that produces forces of high magnitude but very short duration, typically driven by air pressure. There are two effects that result from this input: the repeated impacts generate a line spectrum (equally spaced lines) in the spectral density domain, the shaker table is set into a quasi-resonance condition and all of its modes of vibration are excited. As a result, the spectral density of the shakers is not uniform and can vary by six or more decades. These variations are unacceptable for highly accelerated testing or for simulation applications.

The physical properties of the shaker table components cause the shaker table to respond to the different frequencies in the impact spectrum in different ways. The physical properties of the shaker table components typically resonate with certain vibration frequencies and suppress other vibration frequencies to result in selected modes of vibration. For example, resonation results in the vibrations remaining for a relatively long time compared to the duration of the input pulse, while suppression results in the quenching of the vibration in a relatively short time. The modes of vibration of the shaker table which are excited are also a function of the location, orientation and nature of the actuators as well as the dimensions and properties of the platform. Thus, by designing the shaker table to have relatively low resonant frequencies, the spectral response of the system can be shifted to fill up the low frequency end of the spectrum, but there is a tendency to have significant variation in spectral density.

This shaker table architecture is well known and the great difficulty facing the test engineers in this field is the implementation of the shaker table in a manner to precisely produce the desired vibration conditions in terms of the presence of selected vibration frequencies and regulation of their magnitude. There are obviously numerous variables, each of which affects the magnitude and frequency of the vibrations that are produced. These variables include but are not limited to: number of actuators, actuator placement, actuator characteristics, frequency of actuator operation, physical coupling of the actuator to the shaker table platform, coupling of the product to the shaker table platform, damping elements included in the shaker table, dimensions of the shakertable, shakertable implementation, including materials and intervening structures. A further complicating factor is that these variables can also be interactive, in that the variation of one variable can impact the effects produced by another variable. Thus, the design of a shaker table is a non-trivial task and typically represents a compromise that produces a crude emulation of the desired vibration characteristics. The quest for accuracy in this field is ongoing and has been relatively unsuccessful to date.

Thus, while there exist numerous variations of shaker tables, each implementation presents limitations that prevent the test engineer from effecting precise control over the vibration frequencies and magnitudes to thereby precisely emulate the environment that the product under test will encounter or the environment desired for simulation or stimulation.

The above-noted patent application titled: "Tuned Energy Redistribution System for Vibrating Systems" addresses this problem by selectively reducing discrete frequencies of vibration and translating them into frequency limited broad band vibrations. However, the system described in this patent application is limited in terms of not addressing the simultaneous redistribution of vibration among the six axes of vibration (three translation axes and three rotation axes).

U.S. Pat. No. 4,164,151 issued Aug. 14, 1979 to Douglas C. Nolan et al discloses a random vibration generator that includes a hollow table top for supporting equipment to be subjected to vibration and a sinusoidal reaction-type vibration machine connected to the tabletop to produce a sinusoidal vibration of adjustable frequency and amplitude. The hollow tabletop is divided into four sections, each containing a number of projectiles, such as heavy balls which roll and bounce around within these four sections, impacting the floor and ceiling of the four sections and each other in random fashion to produce random shocks over a wide band of frequency and amplitude, thereby subjecting equipment connected to the tabletop with every possible vibration failure mode that might occur in nature.

Therefore, the field of vibrating systems is devoid of any apparatus that is operable to controllably redistribute energy from axes and frequencies of high acceleration to axes and frequencies of low acceleration. Additionally, the impact driven vibration test systems are usually very weak in the critical low frequency areas of vibration. The existing impact driven vibration test systems not only suffer from a lack of vibration in some frequencies and axes of vibration but also do not have any apparatus that allows the translation of energy from high frequencies to low frequencies of vibration.

SOLUTION

The above-described problems are solved and a technical advance achieved by the present energy redistribution system for a vibrating system that is operable to redistribute energy from axes and frequencies of high acceleration to axes and frequencies of low acceleration. The present energy redistribution system for a vibrating system enables one to balance the vibration spectra and over all levels between axes. In addition, the energy redistribution system for a vibrating system can be used to enhance the low frequency content of the spectra by redistributing energy from the existing vibrations in the high frequency region of the spectrum.

The energy redistribution is accomplished by placing a shaped object into an enclosure, termed an equalizing module, which is attached to the vibrating system. The location of the equalizing module affects the frequency and direction from which energy is removed as the shaped object responds to the vibration present at the location of mounting of the equalizing module. For example, if the location of the equalizing module is at a node (point of no displacement) of a particular mode of the shaker table, then no energy is extracted from that mode at that particular mounting position. If the equalizing module is placed at an anti-node (point of maximum displacement), then the shaped object experiences significant inputs due to the vibration of that mode. When the shaped object impacts an interior surface of the equalizing module, an elastic, or nearly elastic, collision occurs. Since the mass of the shaped object is much less than the mass of the interior surface of the equalizing module that is impacted, the shaped object behaves nearly as if it has impacted an infinite mass. If the interior surface of the equalizing module is moving away from the shaped object, the shaped object rebounds with less velocity than it had before impact. The relative velocity, however, is the same from impulse-momentum theory. If the interior surface of the equalizing module is moving toward the shaped object at the instant of impact, the interior surface of the equalizing module imparts additional velocity to the shaped object. The shaped object flies away in either case to impact another interior surface of the equalizing module. The initial impact causes an infinite series of line spectra to be generated in the table (normal to the impact) with a cut off frequency (frequency where the spectrum rolls off) as determined by the programmer or flexible interior surface of the equalizing module as described below. This impact event can translate high frequency vibration into low frequency vibration in the table if a soft programmer is used. The use of programmers to shape the impact pulses allows the translation of vibration from one frequency and axis of high acceleration to a broad band of frequencies with the upper cutoff frequency defined by the programmer stiffness. The programmer stiffness can be different in each axis or on each plane of the impact surfaces, and shapes the vibration translated from one plane to another.

It is normal for the vertical acceleration of the impact type of shakers to be substantially more than in the horizontal directions. This is so because the shakers are somewhat like plates and bend out of plane much more than they distort in the plane of the plates. This being the case, the equalizing module takes energy from the vertical direction and transfers it to the horizontal directions.

The shaped object can be coated with a programmer material, that is, with a plastic like material, which shapes the shock pulses when the shaped object impacts the interior surfaces of the equalizing module. This impact imparts momentum to the shaped object with a nearly elastic impact. The shaped object then flies off and impacts another interior surface of the equalizing module and provides an impulse, shaped by the programmer material, that generates a line spectrum in the acceleration spectral density domain. Since the impact is a single event, the line spectrum contains an infinite number of lines up to the cut off frequency determined by the stiffness of the programmer. A short pulse generates a very broad spectrum and a long pulse generates a narrow spectrum. Both result in the low frequency portion of the spectrum and roll off at the higher frequencies as learned from Fourier theory.

The interior surface of the equalizing module can be also made to be elastic, that is, very springy or flexible, and to bend under the impact. This acts as a programmer and shapes the shock pulse. Note that various walls can have different spring rates and shape the spectra differently. Therefore, an axis that is required to have more low frequency acceleration can receive it by making the interior surface of the equalizing module that is normal to that axis flexible. From Newton's law on action and reaction, the shaped object carries only one thing and that is a vector momentum from the last collision and rebound. The interior surfaces of the equalizing module having the highest velocity transfers the most momentum to the shaped object and therefore transmits more momentum to another axis. It is noted that the interior surfaces of the equalizing module all move in a random manner over a very broad frequency range and that calculating the motion of the shaped object is essentially impossible without performing a computer simulation of a specific shaker table with specific vibrator locations.

The present energy redistribution system for a vibrating system has advances over the existing impact driven vibration test systems in that the present energy redistribution system for a vibrating system:

1. Redistributes vibrational energy over all axes of vibration, not just the vertical axis.
2. Every interior surface of the equalizing module can have a different stiffness or be coated with a different programmer material. Additionally, the shaped object can be coated with an elastomer which acts as a programmer.

3. The mounting location of the present energy redistribution system for a vibrating system can select or reject modal frequencies and axes to be reduced or enhanced.

4. The equalizing module can be any shape, not just a rectangular one.

Therefore, the present energy redistribution system for a vibrating system is operable to redistribute energy from axes and frequencies of high acceleration to axes and frequencies of low acceleration. The present energy redistribution system for a vibrating system enables one to balance the vibration spectra and over all levels between axes. In addition, the energy redistribution system for a vibrating system can be used to enhance the low frequency content of the spectra by redistributing energy from the existing vibrations in the high frequency region of the spectrum.

DETAILED DESCRIPTION

It is a problem in the field of vibrating systems to control the amplitude of vibrations as well as the spectral density of vibrations in each of the three orthogonal linear and three rotational axes of vibration. One such vibrating system consists of a mass of predefined shape and extent that responds to a series of impulses by vibrating as a function of the characteristics of the mass, as well as the frequency, pulse shape and magnitude of the impulses applied to the mass and the location of the site at which the impulses are imparted. These vibrating systems typically have very irregular spectra in the above-noted six axes of vibration.

Vibration Test Systems

The field of vibration test systems uses the concept of controllably generating vibrations of predetermined frequency and magnitude to emulate the vibration conditions encountered by a product during its life cycle to determine whether the product is susceptible to failure due to vibration. There are numerous vibration test modes that are used in the vibration test industry. Among these are the Highly Accelerate Life Tests (HALT) that use very high levels of vibration excitation to excite all modes of vibration in the product under test in order to find design and process weak links. Additionally, Highly Accelerated Stress Screens (HASS) comprise vibration tests that use high levels of excitation to find process problems. What is needed for general HALT and HASS vibration applications is a vibration test system that generates low frequency (0–200 Hz) vibrations for some applications, high frequency (200–10,000 Hz) vibrations for other applications and broad band vibration frequencies (0–10,000 Hz) for still other applications.

Typical Interconnection of Two Shaker Modules

Figure 6:
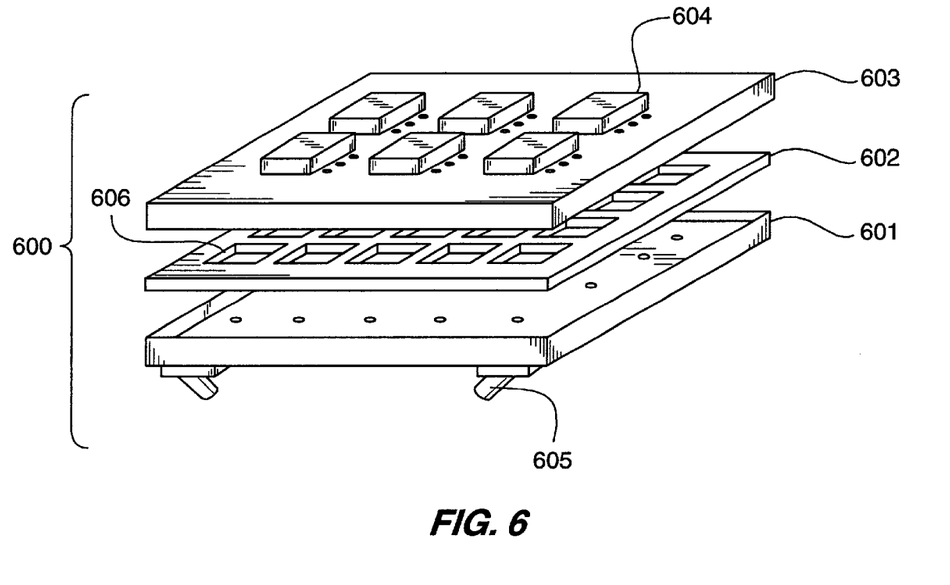
FIG. 6 illustrates in block diagram form an exemplary interconnection of two shaker modules as found in vibration test systems of the prior art.

FIG. 6 illustrates in block diagram form the overall architecture of a typical multi-level vibration test system 600 that consists of the interconnection of two shaker modules 601, 603. This multi-level vibration test system 600 is used herein to illustrate the concept of the invention and the extension to multiple layers (>2) and multiple shaker modules (>1) per layer represents a logical extension of the operation of the embodiment illustrated in FIG. 6. In addition, the following description also provides an illustration of the concept of the invention in a more general application to vibrating systems.

The multi-level vibration test system 600 uses a "primary" shaker module 601 that is a low frequency six (or less) axis vibration system excited by actuators 605 comprising pneumatics, servo-hydraulics, electro-dynamics or mass imbalance, to which is coupled a "secondary" shaker module 603. The two shaker modules 601, 603 are interconnected by a coupling module 602 that comprises springs, pneumatic or elastomeric elements. If the primary shaker module 601 is hydraulically or pneumatically powered, the oil column or air column resonance provides a spring effect. The secondary shaker module 603 can be directly coupled to the primary actuators 605 or by springs as well. The actuators 605 can be implemented by means of well-known elastomeric or pneumatic elements. The springs are described herein since they tend to limit the vibration transfer to only the lower frequencies since the mass of the secondary shaker module 603 as mounted on the springs behaves like a mass on a spring excited by base excitation. This architecture provides a vibration resonance at a natural frequency while isolating the secondary shaker module 603 from frequencies above the square root of two times the resonant frequency. The transmissibility (ratio of response to input in the amplitude and frequency domain) below the resonant frequency is greater than unity, is a maximum at the resonant frequency and then rolls off to provide isolation from the base inputs higher than the square root of two times the resonant frequency.

The secondary shaker module 603, which can be thought of as a plate or fixture on which the product under test 604 is mounted, is equipped with apparatus that provides a direct excitation to the suspended secondary shaker module 603. This additional excitation can be inertially induced in the following ways: 1) attach pneumatic actuators to the secondary shaker module 603 and provide impacts which are shaped in the time domain by programmers, 2) provide imbalanced rotating parts and 3) provide a series of impacts by mechanical means such as masses impacting on the table, 4) provide tuned absorbers which respond to frequencies mostly near their natural frequency and then, when the response displacement is sufficient, impact the secondary shaker module 603 causing broad band vibration to be generated by the series of impacts.

The high frequency portion of the excitation to the product under test is provided by the secondary shaker module 603 being directly excited and is effectively isolated from the primary shaker module 601 by the fact that the primary spring/mass system noted above has a reasonably low natural frequency. The low frequency portion of the excitation to the product under test is principally due to the primary shaker module 601, with the low frequency vibrations being transmitted to the secondary shaker module 603 through the coupling module 602 Thus, each of the modules 601–603 is used to produce a segment of the overall vibration frequency spectrum, thereby enabling the test engineer to optimize the implementation of a selected module to produce only a portion of the vibration frequencies, rather than having to implement all of the vibration frequencies in a single module. This concept is extensible to the use of additional modules that are used to implement the multi-level vibration test system 600. Furthermore, the test engineer has available programmer elements that can be used in the primary shaker module 601, the coupling module 602, the secondary shaker module 603 to shape the characteristic response of each of these elements to thereby precisely control the overall vibration frequency spectrum that is produced by the multi-level vibration test system 600.

Primary Shaker Module

The primary shaker module 601 comprises a plate to which is attached at least one and more likely a plurality of actuators 605 that provide the energy input to create the vibration frequency spectrum for the primary shaker module 601. The primary shaker module 601 is typically supported by flexible supports that provide multi-directional freedom of movement over a predetermined range of motion. The actuators 605 are attached to the plate of the primary shaker module 601 in various selected orientations to generate multi-axial and multi-directional vibrations in the plate. Springs can be added between the plate and the primary excitation system to thereby add low frequencies to high frequencies. The primary shaker module 601 can also be supported directly by pneumatic or hydraulic actuators. This basic architecture of the primary shaker module 601 is similar to that used by existing shaker table systems.

Secondary Shaker Module

The secondary shaker module 603 comprises a plate that is used to mount the product under test 604 and to which can be attached to at least one and more likely a plurality of actuators that provide the energy input to create the vibration frequency spectrum for the secondary shaker module 603. The actuators can be connected between the secondary shaker module 603 and the coupling module 602, and/or between the secondary shaker module 603 and the primary shaker module 601, and/or directly connected to the secondary shaker module 603. Alternatively, the tuned energy redistribution system can either also be used to shape the response of this module absent any active actuators or can be used in conjunction with active actuators.

Coupling Module

The coupling module 602 comprises an instrumentality that functions to transmit the vibration frequencies generated by the primary shaker module 601 to the secondary shaker module 603, typically with the additional input of shaping the vibration frequency spectrum that is transmitted. Thus, the coupling module 602 can comprise any individual element or combination of elements that are known in the vibration test system technology that performs the desired vibration transmission and shaping functions. The coupling module 602 can be a substantially rigid structure or a flexible structure, depending on the nature of the vibration coupling and shaping that is desired. For example, the coupling module 602 can be implemented by a honeycomb element that is comprised of a plurality of chambers 606 that are formed by the use of vertically oriented walls that interconnect an upper plate with a lower plate. The vertically oriented walls are typically formed of a rigid material, to provide a dynamically stiff coupling between the upper and lower plates over a frequency range of interest. The chambers that are formed can be uniform in dimensions or can vary over the extent of the length and width of the upper and lower plates. Thus, the degree of coupling between the upper and lower plates can vary over the cross-section of the coupling module 602.

Architecture of A First Embodiment of the Energy Redistribution System

Figure 1A:
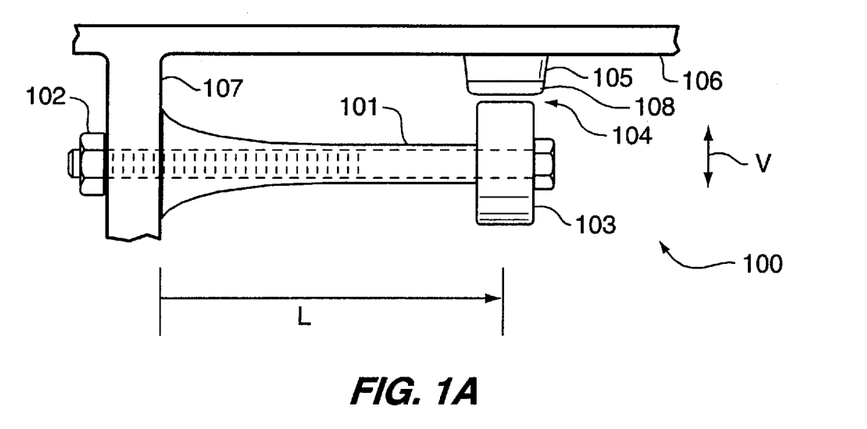
FIGS. 1A–1C illustrate a side and two different end cross-section views of a first embodiment of the present energy redistribution system for a vibrating system.
Figure 1B:
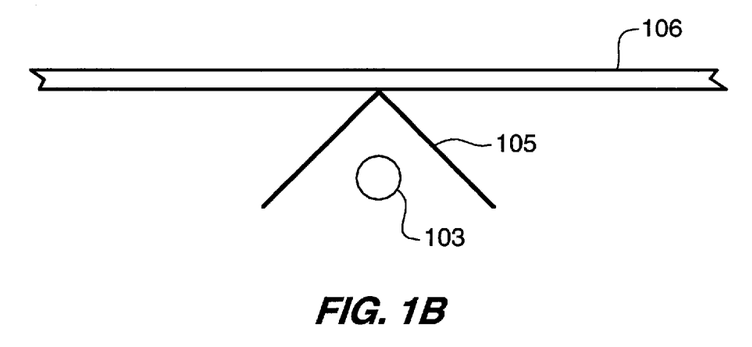
Figure 1C:
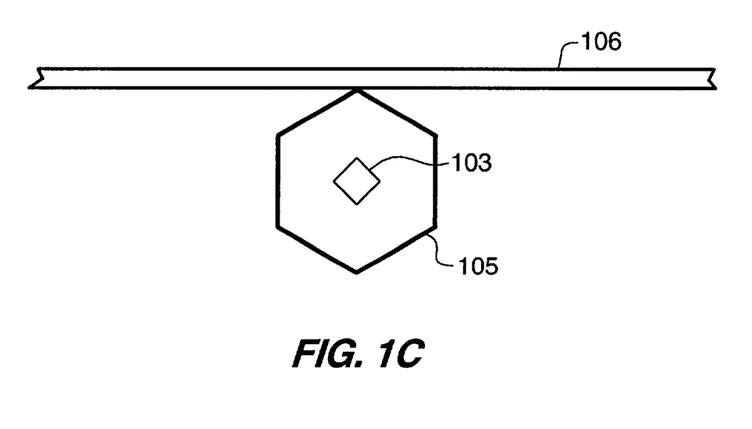

FIGS. 1A–1C illustrate a side and two different end cross-section views of a first embodiment 100 of the present energy redistribution system for a vibrating system that can be used to adjust the vibration frequency spectrum of the plate that is used to implement the primary shaker module 601, or secondary shaker module 603. The use of the energy redistribution systems enable the test engineer to select the vibration frequencies that are produced and the table therefore has adjustable bandwidth and vibration spectrum.

In particular, as shown in FIG. 1A, the tuned energy redistribution system 100 comprises the combination of an adjustable beam 101 and vibration stop 105 that are directly connected to the plate 106. The plate 106 transmits energy that is received from the actuators 605 (and/or the coupling module 602 or from additional vibration inputs from sources directly mounted on plate 108) and, in turn, beam 101 responds to that vibration, primarily at the natural frequency of beam 101. Therefore, the response of beam 101 is principally due to vibration at or near the resonant frequency of beam 101. The adjustable beam 101 Is described herein (for simplicity) as being excited in a vertical mode so that the end of the adjustable beam 101 distal from the mounting member 107 vibrates in a vertical direction, indicated by arrow V. When enough energy is absorbed from the plate 108 by adjustable beam 101, the mass 103 that is affixed to the end of the adjustable beam 101 closes the predetermined adjustable gap 104 and impacts the vibration stop 105 to create a shock pulse, thereby creating a high frequency vibration spectrum. The length of the adjustable beam 101 (shown as a threaded rod element) can be adjusted by use of the nut 102 that enables the threaded rod that comprises the adjustable beam 101 to be lengthened or shortened. Similarly, the size of the mass 103, that is removably mounted on the distal end of the adjustable beam 101, can be selected to create impacts of magnitude and frequency desired by the test engineer. The adjustable stop can comprise or include a programmer 106 to shape the vibration. spectrum that is generated by the action of the tuned energy redistribution system.

FIGS. 1B, 1C illustrate two different end cross-section views of the vibration stop 105 used in the first embodiment 100 of the present energy redistribution system for a vibrating system. In particular, the vibration stop 105 shown in FIG. 1A is shown as a flat surface to illustrate the relation among the other elements of the first embodiment 100 of the energy redistribution system for a vibrating system, but is instead typically implements as a multi-dimensional solid surface. For example, FIG. 1B illustrates an open sided triangular surface while FIG. 1C illustrates a closed polygon surface. For the purposes of this description, the vibration stop 105 is described as being polygonal in shape, which term is intended to encompass both open sided as well as totally enclosing surfaces. The polygons can be regular, having equal length sides, or can be irregular, having at least one side that is of length different than the other sides. The polygons can be oriented to provide no interior surfaces that are coplanar with the x-axis, as shown in FIG. 1B, or at least one interior surface of the polygon can be coplanar with the x-axis (or the y-axis or the z-axis). The mass 103 can also be of differing shape. For example, the mass 103 can be cylindrical in shape as shown in FIG. 1B, or polygonal in shape as shown in FIG. 1C.

The cantilever beam or equivalent is selected and the resonance of the beam is tuned to the frequency to be absorbed. However, when the resonant frequency is very low, perhaps 10 Hz, the tip mass essentially floats around until the cavity wall moves enough to cause an impact. The impact generally is caused by the frequency of motion that has the largest displacement. This frequency is generally the lowest frequency peak in the acceleration vibration spectrum. For example, on a rigid or flexible shaker of common design, the low frequency spectrum shows a distinct line spectrum below the resonances of the table which are commonly above 100 Hz. The beam therefore is "self tuning" to the lowest frequency which has a peak in the acceleration spectrum, generally the first line due to the vibrator, L1 say. If this line is absorbed and then redistributed across a bandwidth determined by the programmer, or equivalent programmer (programmer plus elastic wall), then the lowest frequency line that stands out is the former second line in the spectrum. Therefore, the next frequency to be reduced is the second peak in the spectrum as it occurs with no tuning. Nearly immediately upon extracting vibration from the shaker or fixture at this frequency, L2 say, then the first line, L1, again rises up and become the vibration frequency with the highest vibration displacement. In this way, the very low frequency beam absorbs vibration at the lowest lines in the acceleration spectrum caused by the impacting vibrators and also affects the second peak to some degree as well. A tuned energy redistributer which is tuned to near the third line of the spectrum similarly absorbs vibration at the third (and lower) peak(s).

Placement of the tuned absorbers affects results greatly as, when placed near a node of a mode at a particular frequency, there is very little absorption of vibration near that frequency because of the limited motion at the node. When placed at an anti-node of a particular mode, the motion is much larger causing some absorption to take place. Therefore, a group of beams tuned to one frequency could absorb and redistribute quite differently depending upon placement with respect to nodes and anti-nodes of any particular mode. Some degree of tuning could be accomplished by adjusting the clearance between the shaped object and the moving shaker.

Architecture of A Second Embodiment of the Energy Redistribution System

Figure 2A:
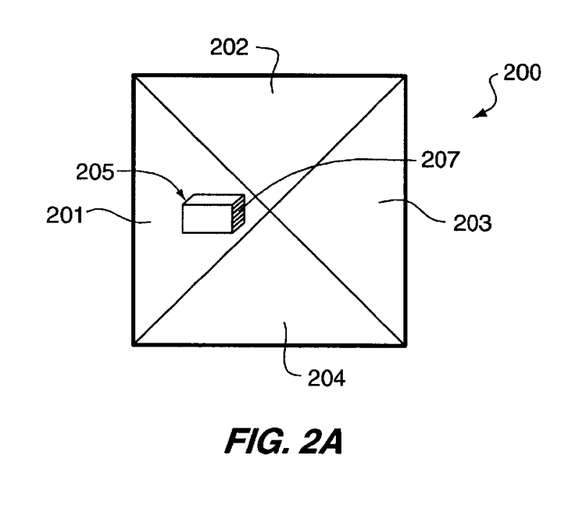
FIGS. 2A–2B illustrate a perspective plan view and a side cross-section view, respectively, of a second embodiment of the present energy redistribution system for a vibrating system.
Figure 2B:
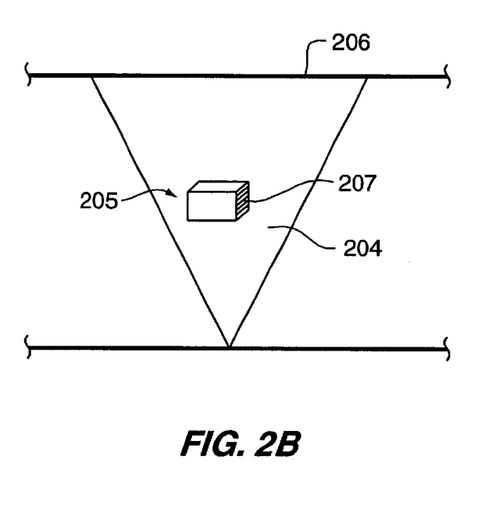

FIGS. 2A–2B illustrate perspective plan view and a side cross-section view, respectively, of a second embodiment of the present energy redistribution system for a vibrating system that can be used to adjust the vibration frequency spectrum of the plate that is used to implement the primary shaker module 601, or secondary shaker module 603. The use of the energy redistribution systems enable the test engineer to select the vibration frequencies that are produced and the table therefore has adjustable bandwidth and vibration spectrum.

This second embodiment of the present energy redistribution system for a vibrating system uses a shaped object 205 placed inside of a cavity that is used to implement the equalizing module 200. The equalizing module 200 is shown as pyramidal in shape, having four angular sides 201–204 and a top surface 206 which enclose a shaped object 205.

1) Put a steel, lead or other dense material shaped object 205 inside a cavity of the equalizing module 200 which is mounted on the shaker or fixture. When the shaker table vibrates, the shaped object 205 is thrown against the interior surfaces of the cavity of the equalizing module 200 causing an impact. The vibration pulse generated by this impact can be shaped by programmers 207 on the shaped object or the interior surfaces of the cavity of the equalizing module 200 or both.

The interior surfaces of the cavity of the equalizing module 200 can additionally be elastic, further shaping the pulse. A low stiffness in the combination of the programmer 207 and the interior surfaces of the cavity of the equalizing module 200 leads to a low frequency cutoff of the spectrum. Conversely, a very stiff programmer/interior surface combination causes a high cutoff frequency in the vibration spectrum.

2) The cavity of the equalizing module 200 can have sides that are of equal dimensions or unequal dimensions. This allows the vibration shaping properties of the equalizing module 200 to be different in the three axes.

3) The programmers or interior surfaces of the cavity of the equalizing module 200 can have different stiffness in the various axes, allowing different cutoff frequencies of vibration in the various axes.

4) It is expected that the frequency of highest velocity is the frequency where the vibration absorption is the highest due to the impulse/momentum nature of the impacts.

Shaped Objects and Programmers

Figure 3:
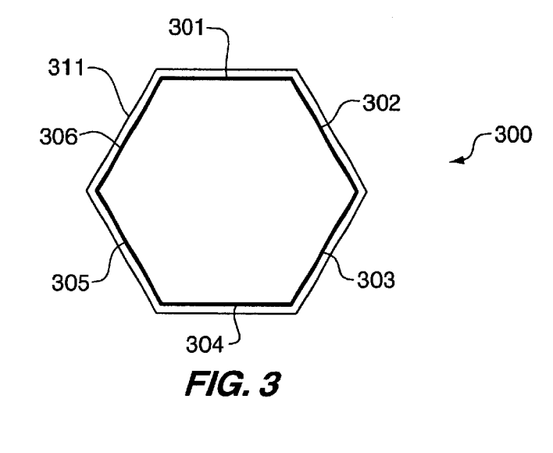
FIG. 3 illustrates a shaped object coated with programmer material for use in the present energy redistribution system for a vibrating system.

The operation of the tuned energy redistribution systems 100, 200 described above can be modified by the use of programmers and shaped objects of different shape. FIG. 3 illustrates a shaped object 300 coated with programmer material for use in the present energy redistribution system for a vibrating system. The shaped object is a polygonal solid as shown in cross-section view, with six sides 301–306. Programmers comprise coatings, such as 311 that have predetermined physical characteristics that change the bandwidth of the vibration frequencies that are produced. For example, the vibration frequency spectrum that results from the shock pulse generated by a tuned energy redistribution system can be shaped by placing a programmer between the impacting mass and the table. For this purpose, Delrin® acetal resins are the preferred material although other materials, such as those used to manufacture roller blade wheels, are also appropriate due to their resiliency. These materials typically generate more low frequency vibrations than the Delrin materials due to the fact that they are softer materials. The Delrin acetal resins produced by Dupont are crystalline thermoplastic homopolymers made by the polymerization of formaldehyde. The beneficial characteristics of Delrin acetal resins are: high mechanical strength and rigidity, high fatigue endurance, high resistance to repeated impact, low coefficient of friction, excellent dimensional stability. The physical dimensions and material properties of the programmer determine the stiffness and therefore the pulse shape, which need not be half sine.

Equalizing Module with Flexible Walls And/or Programers

Figure 4A:
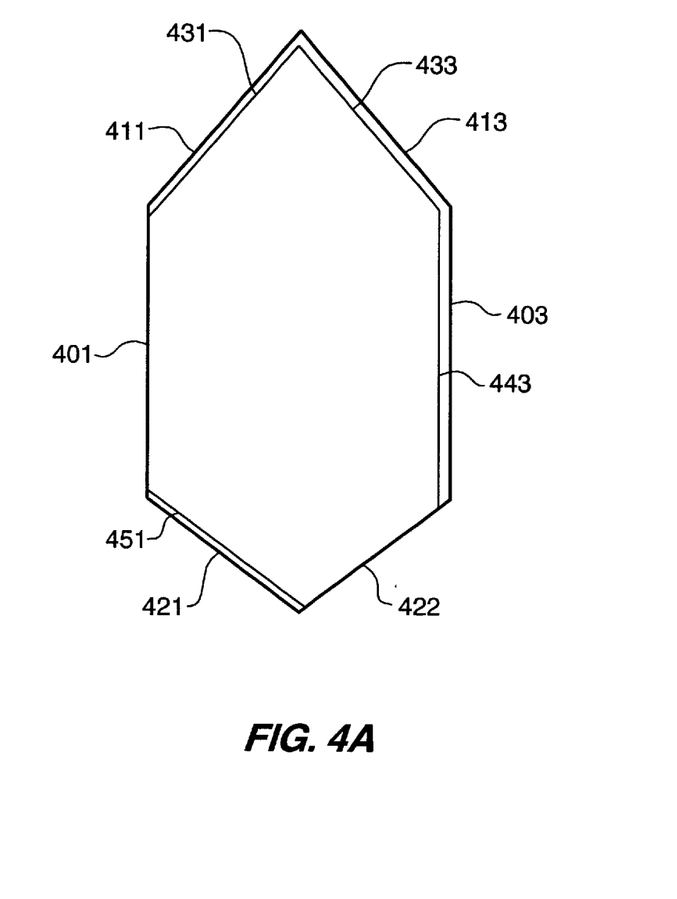
FIGS. 4A & 4B illustrate a perspective plan view and a cross-section view, respectively of an equalizing module with flexible walls for use in the present energy redistribution system for a vibrating system.
Figure 4B:
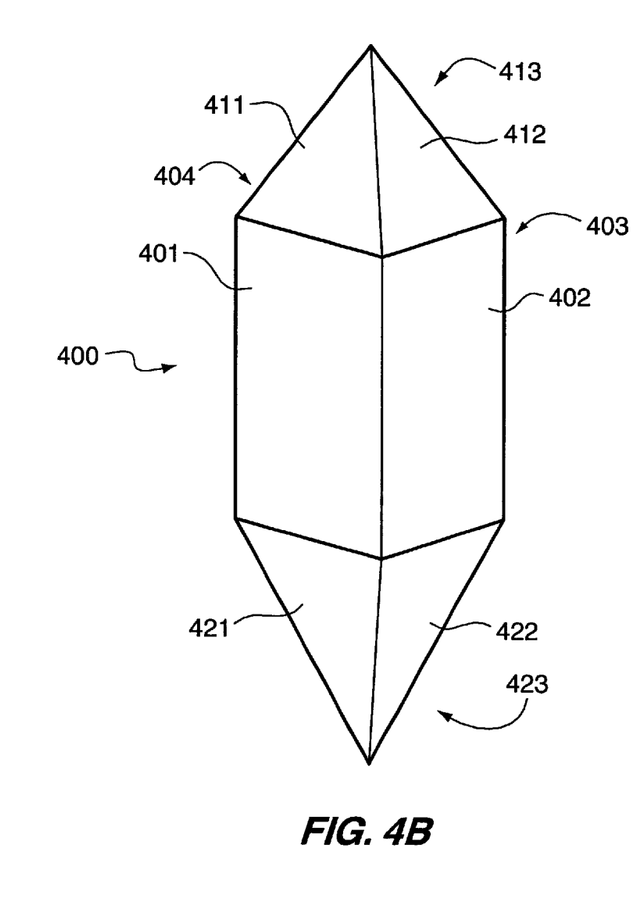

FIGS. 4A & 4B illustrate a perspective plan view and a cross-section view, respectively, of an equalizing module 400 with flexible walls for use in the present energy redistribution system for a vibrating system. As shown in FIG. 4A, the equalization module 400 consists of a chamber having a pyramidal top with sides 411–414, a pyramidal bottom with sides 421–424 and sides 401–404 that interconnect the corresponding sides on the pyramidal top 411–414 and the pyramidal bottom 421–424. The various sides 401–404, 411–414, 421–424 can be of different thickness and/or have programmers 431, 433, 443, 451 shown in FIG. 4B of different thickness and/or elasticity characteristics.

Implementation of a Tuned Energy Redistribution System

The present tuned energy redistribution system operates in a dual mode paradigm wherein the tuned energy redistribution system operates as a tuned absorber until the mass strikes the stop which may be coated with the optional programmer. At this time, a nearly elastic impact and rebound occurs. The impact of the mass striking the vibration stop supplies a pulse input to the point of attachment of the tuned energy redistribution system to the multi-level vibration test system 100 and changes the velocity of the mass with a relatively small loss of relative velocity. The pulse shape generated by this impact determines the bandwidth of the resulting vibration in the element of the multi-level vibration test system 100 that was struck by the mass.

While the operation of the tuned energy redistribution system appears straightforward, a precise mathematical analysis of the tuned energy redistribution system is impractical or even impossible. This is due to the fact that a series of impacts, spaced apart in time at regular intervals can be represented by a series of spectral lines in the frequency domain, with an infinite series of spectral lines in the frequency domain being obtained when the distances between the input pulses goes to infinity. However, in the present case, the impacts are not at regular intervals due to the random vibration of the multi-level vibration test system 100. An irregular series of pulses, resulting from the random vibration, generate a smeared line spectrum, where the spectral lines move back and forth in the frequency domain. Therefore, the operation of the tuned energy redistribution system cannot be precisely defined mathematically due to the lack of a predetermined and regular vibration of the multi-level vibration test system 100. In operation, the dynamic response of the tuned absorber mode of operation of the tuned energy redistribution system can be characterized using linear theory until an impact occurs. At this point, the computations change to represent the impulse nature of this impact. The impact of the tuned absorber mass is small in magnitude because the change in vibrational displacement of the mass in the cycle in which contact occurs is only due to the change in vibrational displacement over the last cycle. Using impulse-momentum theory, the changes in velocities in the multi-level vibration test system 100 and mass can be calculated. The mass and the shaker table both experience an impulsive change in velocity, which is difficult to compute in the case of the shaker table. The multi-level vibration test system 100 and the tuned energy redistribution system both revert to a normal vibration mode using normal vibration theory for the shaker and a constant linear velocity for the mass, as modified by shaker motion until another impact occurs. There is a six axis motion in the multi-level vibration test system 100 and the degree of complexity of the resultant computations is overwhelming.

Figure 5:
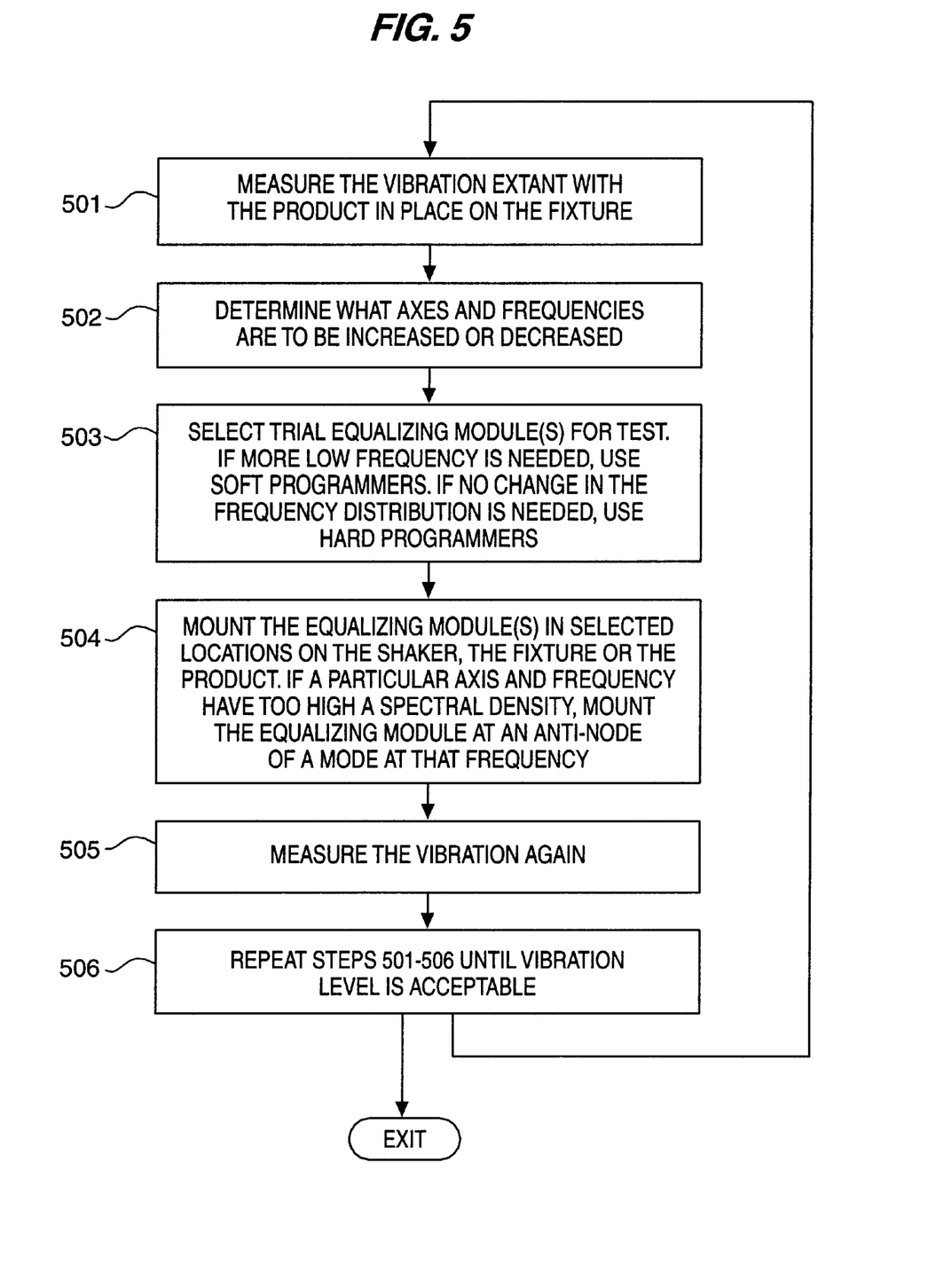
FIG. 5 illustrates in flow diagram form the process used in the selection of a typical tuned energy redistribution system in the present energy redistribution system for a vibrating system.

Therefore, a practical method, such as that illustrated in flow diagram form in FIG. 5, is required to enable a user to determine the necessary characteristics of the tuned energy redistribution system. In operation, the shakertable, with the system under test 604 attached thereto, is analyzed at step 501 Measure the vibration extant with the product in place on the fixture. 502 Determine what axes and frequencies are to be increased or decreased. 503 Select trial equalizing module(s) for test. If more low frequency is needed, use soft programmers. If no change in the frequency distribution is needed, use hard programmers. 504 Mount the equalizing module(s) in selected locations on the shaker, the fixture or the product. If a particular axis and frequency have too high a spectral density, mount the equalizing module at an anti-node of a mode at that frequency. 505 Measure the vibration again. 506 Repeat steps 501–506 until satisfactory results are obtained.

SUMMARY

The present energy redistribution system for a vibrating system is operable to redistribute energy from axes and frequencies of high acceleration to axes and frequencies of low acceleration. The present energy redistribution system for a vibrating system enables one to balance the vibration spectra and over all levels between axes. In addition, the energy redistribution system for a vibrating system can be used to enhance the low frequency content of the spectra by redistributing energy from the existing vibrations in the high frequency region of the spectrum.

What is claimed is:

1. An energy redistribution system that is operational in a vibrating system to produce vibrations at a predetermined set of frequencies and in predetermined directions, said energy redistribution system comprises:

means, directly connected to said vibrating system at or near a predetermined location on said vibrating system, for vibrating at frequencies at or near a natural resonant frequency of said predetermined location on said vibrating system and in predetermined directions in response to vibration of said vibrating system; and a plurality of means, directly connected to said vibrating system, each of which is located a predetermined adjustable distance from said means for vibrating in each of a plurality of directions from said means for vibrating, at least two of which are not orthogonal to each other, when said means for vibrating is devoid of vibration, for causing an impact with said means for vibrating when said means for vibrating vibrates a displacement equal to said predetermined adjustable distance in each of said plurality of directions causing broad band vibration to be generated in said vibrating system in each of said plurality of directions at said predetermined location on said vibrating system by said impact.

2. The energy redistribution system of claim 1 further comprising;

programmer means located between said means for vibrating and said means for causing an impact for shaping a vibration spectrum of said impact.

3. The energy redistribution system of claim 1 wherein said energy redistribution system vibrates at or near the natural frequency of a mode of vibration of said vibrating system to be damped.

4. The energy redistribution system of claim 1 wherein said means for causing an impact comprises;

multi-dimensional solid surface means having at least two surfaces facing said means for vibrating for impacting said means for vibrating when said means for vibrating vibrates in said plurality of said directions.

5. The energy redistribution system of claim 4 wherein said means for causing an impact further comprises:

programmer means mounted on at least one of said at least two surfaces of said means for causing an impact for shaping a vibration spectrum of said impact.

6. A method of operating an energy redistribution system that is operational in a vibrating system to produce vibrations at a predetermined set of frequencies and in predetermined directions, said method of operating an energy redistribution system comprises the steps of:

directly connecting to said vibrating system at or near a predetermined location on said vibrating system, apparatus for vibrating at frequencies at or near a natural resonant frequency of said predetermined location on said vibrating system and in predetermined directions in response to vibration of said vibrating system; and directly connecting to said vibrating system a plurality of vibration Stops, each of which is located a predetermined adjustable distance from said vibrating apparatus in each of a plurality of directions from said vibrating apparatus, at least two of which are not orthogonal to each other, when said vibrating apparatus is devoid of vibration, for causing an impact with said vibrating apparatus when said vibrating apparatus vibrates a displacement equal to said predetermined adjustable distance in each of said plurality of directions causing broad band vibration to be generated in said vibrating system in each of said plurality of directions at said predetermined location on said vibrating system by said impact.

7. The method of operating an energy redistribution system of claim 6 further comprising the step of:

mounting a programmer between said vibrating apparatus and said vibration stops for causing an impact for shaping a vibration spectrum of said impact.

8. The method of operating an energy redistribution system of claim 6 wherein said energy redistribution system vibrates at or near the natural frequency of a mode of vibration of said vibrating system to be damped.

9. The method of operating an energy redistribution system of claim 6 wherein said step of directly connecting said vibration stops comprises:

mounting a multi-dimensional solid surface apparatus having at least two surfaces facing said vibrating apparatus for impacting said vibrating apparatus when said vibrating apparatus vibrates in said plurality of said directions.

10. The method of operating an energy redistribution system of claim 9 wherein said step of directly connecting said impacting apparatus further comprises:

mounting a programmer on at. least one of said at least two surfaces of said vibration stops for shaping a vibration spectrum of said impact.

* * * * *